Figure 1:
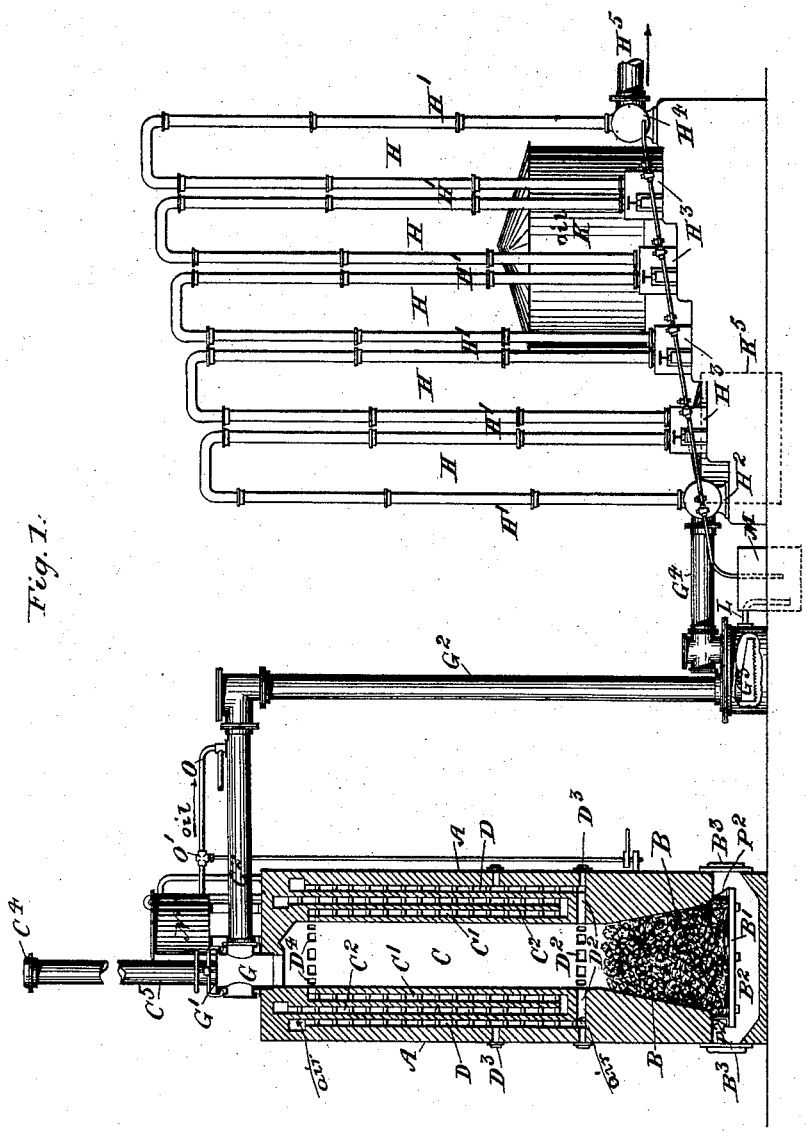

(No Model.) 5 Sheets—Sheet 1.

W. YOUNG.
PROCESS OF MAKING ILLUMINATING GAS.

No. 533,696. Patented Feb. 5, 1895.

Witnesses:—
E. K. Sturtevant
E. A. Scott

Inventor:—
William Young
by Richardson
Attys (No Model.) 5 Sheets—Sheet 2.
W. YOUNG.
PROCESS OF MAKING ILLUMINATING GAS.
No. 533,696. Patented Feb. 5, 1895.
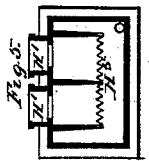
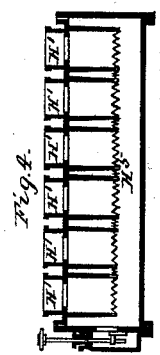
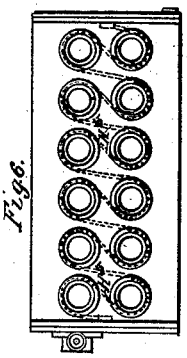
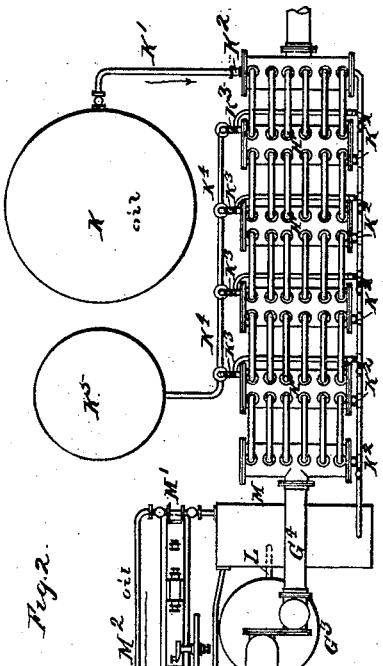
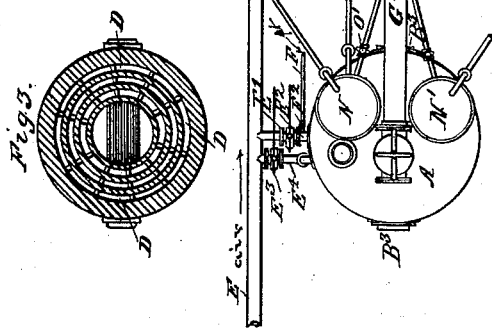
Witnesses:
E. K. Sturtevant
E. A. Scott
Inventor:—
William Young
by Richards &Co
Attys (No Model.) 5 Sheets—Sheet 3.
W. YOUNG.
PROCESS OF MAKING ILLUMINATING GAS.
No. 533,696. Patented Feb. 5, 1895.
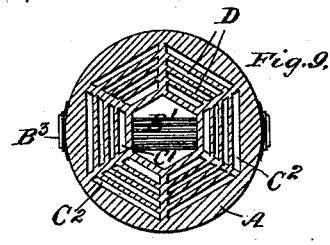
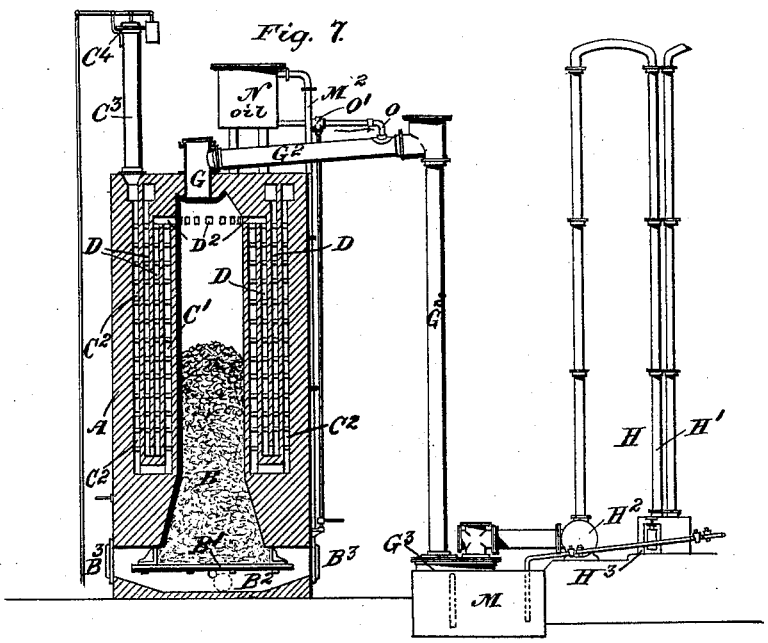
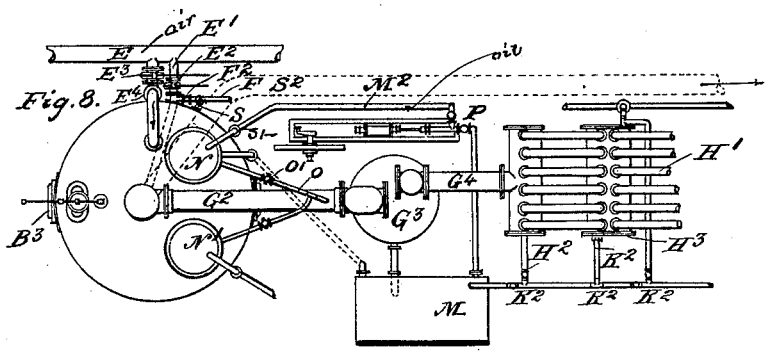
Witnesses:
E. K. Sturtevant
E. A. Scott
Inventor:-
William Young
by Richards
Atty.

(No Model.) 5 Sheets—Sheet 4.
W. YOUNG.
PROCESS OF MAKING ILLUMINATING GAS.
No. 533,696. Patented Feb. 5, 1895.
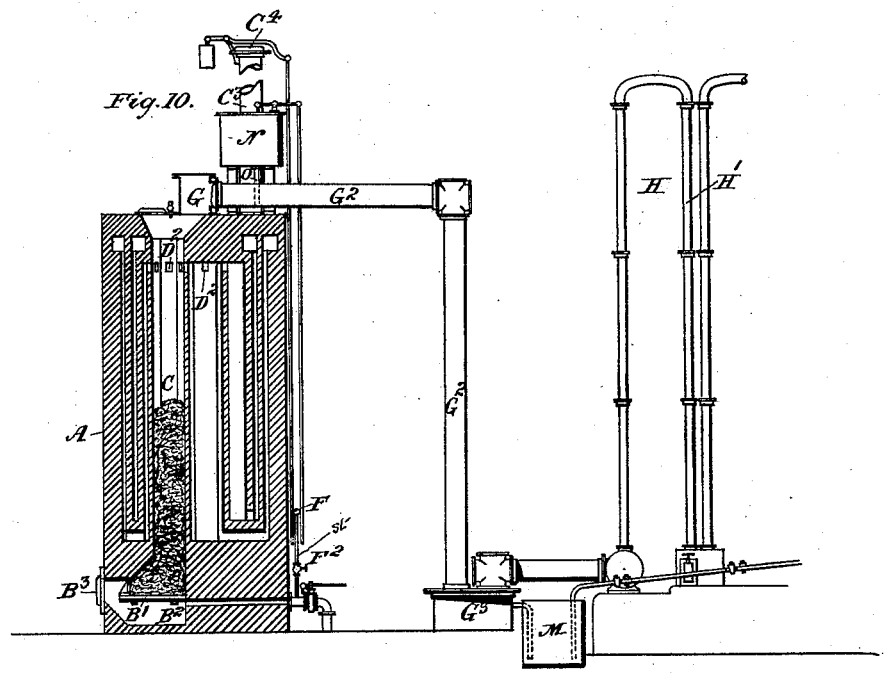
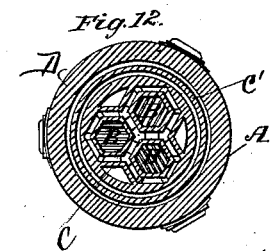
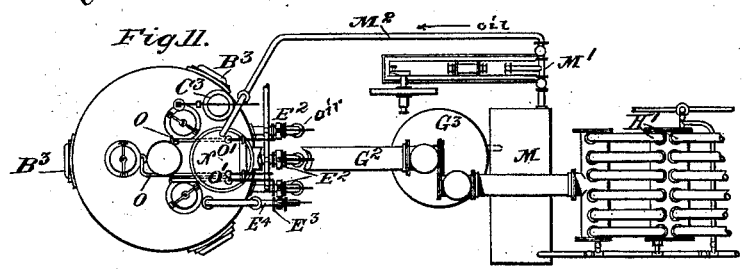

(No Model.)  5 Sheets—Sheet 5.
W. YOUNG.
PROCESS OF MAKING ILLUMINATING GAS.
No. 533,696.  Patented Feb. 5, 1895.
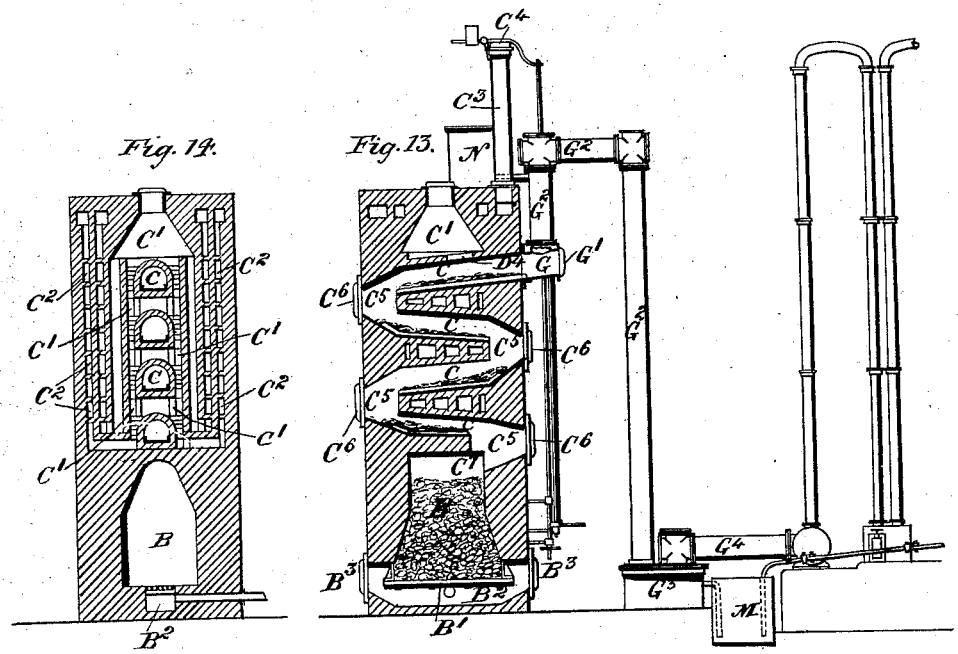
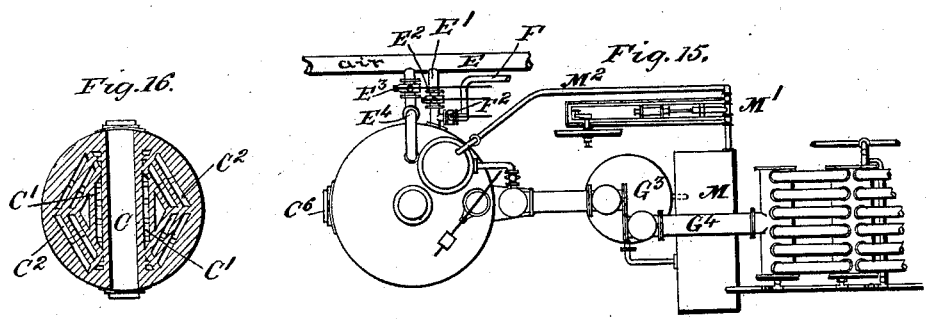

UNITED STATES PATENT OFFICE.

WILLIAM YOUNG, OF PEEBLES, SCOTLAND.

PROCESS OF MAKING ILLUMINATING-GAS.

SPECIFICATION forming part of Letters Patent No. 533,696, dated February 5, 1885.

Application filed May 9, 1894. Serial No. 510,659. (No specimens.) Patented in England June 23, 1893, No. 12,355.

*To all whom it may concern:*

Be it known that I, WILLIAM YOUNG, consulting chemist, of Briorsford, Peebles, in the county of Peebles, Scotland, have invented new and useful Improvements in the Production of Illuminating-Gas from Mineral Oils and for Producing Water Gas, (which have not been patented in any country except Great Britain by Letters Patent No. 12,355, dated June 23, 1893;) and I do hereby declare that the following is a full, clear, and exact description of the invention, which will enable others skilled in the art or manufacture to which it relates to make and use the same.

This invention relates to the production of illuminating and heating gases by that class of processes in which a mass of carbon placed in a cupola furnace is fired and blown up by a current of air so as to become highly heated and at the same time heat up a mass of brickwork or other material contained in the cupola or an attached chamber, thereafter employing the heat so obtained and stored up to produce water gas and decompose liquid hydrocarbons to carburet the water gas. By all such processes the major part of the carbon employed to produce the heat has been obtained from sources outside the hydrocarbon employed and has consisted of anthracite coal, gas coke or other carbonaceous substances, and the water gas has been produced at the same time that the hydrocarbon was decomposed.

Now most liquid hydrocarbons employed for the production of illuminating gas contain in their constitution a considerable quantity of carbon in excess of what can be rendered gaseous by destructive distillation. Especially is that the case with crude tarry oils of high specific gravity. In existing forms of apparatus and as that class of processes are at present conducted, that excess of carbon has hitherto caused considerable trouble either from the carbon being deposited upon and closing up the brick-work passages, or being set free as flocculent carbon which being carried forward in the current of gases choked up the condensing apparatus rendering the resulting tars thick and pitchy.

This invention has for its object to overcome those difficulties and it comprises an improved process of producing gas from liquid hydrocarbons so conducted that the excess of carbon which has hitherto been a source of trouble may be eliminated during the process of decomposition, in such a form and under such conditions as to be available to produce by its partial combustion in air the heat necessary to decompose the hydrocarbon fluids and also to produce water gas sufficient to wash out the apparatus and if desired dilute the rich hydrocarbon gases.

The accompanying drawings represent four modifications of the apparatus which I believe will most conveniently and commercially produce the results aimed at.

Figure 1 is an elevation partly in section showing one modification of the general arrangement of apparatus. Fig. 2 is a plan corresponding to Fig. 1. Fig. 3 is a cross section of the gas producing arrangement. Figs. 4 and 5 are vertical sections at right angles to each other of the condensing chests. Fig. 6 is a plan view of Fig. 5. Figs. 7, 8 and 9 are respectively sectional, plan and cross sectional views of a modified form of producer. Figs. 10, 11 and 12 are similar views of a modified form of apparatus. Figs. 13 and 14 show a modification, these figures being vertical sections at right angles to each other. Figs. 15 and 16 show a plan and cross section of the producer. In these and the other drawings hereinafter referred to the same reference letters are used to mark the same or like parts wherever they are repeated.

The apparatus comprises a vertical cylindrical producer A built of riveted boiler plates, having in the lower part a combustion and water gas generating chamber B, the walls of which are built of firebrick and provided with fire bars B', ash pit B² and cleaning and clinkering doors B³. Over the combustion chamber is built, also of fire brick, a decomposing chamber C in which the vapors of the liquid hydrocarbons are exposed to the action of radiant heat. The walls of the decomposing chamber C are perforated with a series of ports and openings D⁴ and surrounded by annular spaces or flues C' and C² terminating in the stack C³ provided with the valve C⁴. The annular space or flue D between the outer wall and the wall inclosing the space C² is for the admission of a secondary air supply which enters the bottom of the decomposing chamber C by the openings D². Sight holes D³ are provided in the sides of the producer to allow of the temperature of these flues being observed.

The air necessary for the process is supplied from any convenient blowing arrangement by the pipe E, the primary air for the burning of the carbon into carbonic oxide gas being supplied through the valve E' and pipe E² to the ashpit B², and the secondary air to consume the carbonic oxide gas into carbonic acid gas by the valve E³ and pipe E⁴ to the annular heating space in the flue D.

The steam necessary for the process is supplied through the pipe F and regulating valve F² into the ashpit B² through the same pipe as the air.

In the top of the producer there is an opening G provided with a door G' and the outlet pipe for the gases G² leading to the seal and wash box G³ connected up by the pipe G⁴ to the condensing arrangement H which consists of the series of vertical pipes H' rising from the main H² and ascending and descending alternately from the chests H³ and finally descending into the main H⁴ to the outlet pipe H⁵ leading to the gas purifiers.

The store tank K for the supply of the hydrocarbon fluid to be decomposed is placed at such an elevation that the fluid on its way to be decomposed can be made to flow through the arrangement of pipes K' and valves K² through all or any number of the condenser chests H³ and through the pipes G⁴ into the seal box G³ and overflow by the pipes L into the store cistern M from which it is drawn and raised by the pump M' through the pipe M² into the cistern N placed on the top of the producer A. From the bottom of the cistern N the pipe O provided with the stop cock O' is led to the gas outlet pipe G².

When starting the apparatus the hydrocarbon fluid to be decomposed is charged from the supply tank K into the various parts of the apparatus so as to seal the condenser chests H³ and also the main seal box G³ and overflow into the cistern M and a supply is pumped into the cistern N on top of producer A. The combustion and water gas generator B is then charged by the door G' with any convenient kind of carbon, preferably anthracite coal, or gas or other description of coke and kindled. The valve C⁴ on the smoke stack C³ being opened, the primary blast of air is turned on by opening the valve E² admitting the air to the ashpit B² and the fire bars B'. The quantity of coke or other fuel should have a depth of several feet and on this mass of carbon becoming sufficiently heated to allow of the kindling of the carbonic oxide gas over its surface, the secondary air valve E³ is opened and the air admitted through the pipe E⁴ and annular air space D and ports D² into the bottom of the decomposing chamber C and over the surface of the carbon. The air valves E² and E³ are adjusted so that the carbon will be completely consumed into carbonic acid gas. The two adjusted blasts of air are kept blowing into the chamber B till the desired temperature is attained in the mass of carbon in the chamber B and in the walls of the decomposing chamber C and also the walls of the surrounding annular flue spaces C' and C². On the desired temperature being reached, which can be observed by the sight holes D³ provided for the purpose in the sides of the producer and which necessarily varies dependent upon the nature of the liquid hydrocarbon being employed, but which is soon ascertained in practice, both air valves are closed and steam admitted under the fire bars by opening the valve F². The steam passing up through the carbon in chamber B becomes decomposed into water gas and the process is continued till all the air and products of combustion have been entirely displaced by the water gas. The stack valve C⁴ is then closed and the flow of steam into the chamber stopped or at least so greatly reduced that only sufficient water gas is made to prevent the vapors of the liquid hydrocarbons from their high specific gravity sinking through the mass of heated carbon. The object of lessening or stopping the production of water gas during the decomposition of the liquid hydrocarbon is that the presence of the water gas interferes with the decomposition of hydrocarbon vapor in various ways, particularly when the decomposition is effected by radiant heat. The stop cock O' on the pipe O is now opened which admits the hydrocarbon fluid into the gas outlet pipe G² flowing down which it drops through the whole depth of the decomposing chamber C upon the surface of the highly heated coke in the chamber C where it spreads and is rapidly volatilized and rising in vapor through the decomposing chamber C it is subjected to the action of the heat from the walls of the chamber becoming to a considerable degree gasified. The flocculent carbon and dense hydrocarbon set free or produced during the decomposing process owing to the slow upward current in the decomposing chamber C to a large extent keep falling or get entangled in the descending inflowing hydrocarbon liquid and agglutinate or cake upon the surface of the hot carbon in a hard or solid condition which will stand the blast of air in blowing up for the next run.

The rate at which the hydrocarbon is allowed to flow into the decomposing chamber C and upon the surface of the heated carbon B is so adjusted that a considerable quantity of the hydrocarbon will escape as vapor and accompany that portion that has been completely gasified. To insure such being the case the hydrocarbon fluid is run into the chamber at a greater rate at first when the temperature of the heat is high, gradually slowing as the temperature falls. This is automatically accomplished by the greater pressure upon the cistern N at first when full, lessening as it empties, but any other convenient means of adjusting the flow may be used, the object being that the hydrocarbon vapor accompanying the gasified portion will in condensing hold in solution any flocculent carbon that may be present and keep the apparatus free from all obstruction and enable the flocculent carbon to be returned to the producer to form hard coke for use there. The gases and vapors leaving the chamber by the pipe $G^2$ enter and pass through the hydrocarbon liquid in the seal box $G^3$, thence to the condensers H where they are subjected to the alternate cooling action in the series of vertical pipes $H'$ and to the washing action of the hydrocarbon liquid contained in the chests $H^3$ which are provided with the serrated partition $H^5$ (shown in Figs. 4, 5 and 6) under which the gases are made to bubble and pass through the contained liquid.

The operation of producing gas by the decomposition of the liquid hydrocarbon is continued till the heat in the decomposing chamber falls to a temperature so low that the process of gasifying becomes slow. The hydrocarbon fluid is then stopped by closing the stop cock $O'$ and steam is again turned into the mass of carbon by opening the valve $F^2$, still in an incandescent state and sufficient water gas produced to sweep out of the chamber to the condensers the residual hydrocarbon vapors and gases, and should vapor still remain in the flue space it may be swept out by means of steam. Sufficient water gas having been produced for the purpose, the steam is shut off, the stack valve $C^4$ opened and the air valve $E^2$ for the admission of the primary air under the fire bars $B'$ opened, the secondary air supply valve $E^3$ being then also opened, care being taken to see that the carbonic oxide gas fires immediately on the admission of the secondary air so as to prevent explosion. The ignition of the gas can be readily accomplished by inserting a flame of gas or a torch through the sight holes $B^3$. The two currents of air are kept blowing into the chamber till the carbon in the producer and the walls of the decomposing chamber are again brought up to the proper temperature. Meantime a supply of hydrocarbon fluid is raised by the pump $M'$ from the cistern M into the supply cistern N on the top of the producer A, and a supply of the hydrocarbon liquid as near as can be calculated equal to what is being gasified in the producer run into the condensing arrangement H from the tank K. On the desired temperature being attained in the carbon in the producer and in the walls of the decomposing chamber, both the air valves are closed and the steam turned on under the fire bars and up through the carbon, producing water gas to displace the products of combustion, the stack being then closed and the steam stopped or checked and the hydrocarbon fluid run into the chamber all as before described.

The processes of blowing up with air so as to heat the carbon and the walls of the decomposing chamber to the desired temperature and thereafter employing the stored up heat to produce water gas and decompose the liquid hydrocarbon are carried on consecutively in a continuous manner.

The carbon originally charged into the combustion chamber is rapidly consumed by the air blast and in decomposing the steam into water gas, but from the manner of conducting the process by which the hydrocarbon fluid and condensed products are returned from the condenser to the gas producing chamber there is deposited upon the surface of the carbon contained in the combustion and gas generating chamber a quantity of carbon from the decomposed liquid hydrocarbon equivalent to the carbon consumed in performing the operation of the process. Indeed most liquid hydrocarbons when gasified in accordance with this invention produce more fixed carbon than is necessary to simply gasify themselves and supply water gas to wash out the apparatus, and in such cases it is necessary either to withdraw a part of the carbon from the producer, which is done through the clinkering doors $B^3$ by withdrawing the guide piece $P^2$ and raking out the desired quantity of coke, or the surplus carbon is employed to produce a larger quantity of water gas. When such is the object of the process the gas producer is preferably modified as shown in Figs. 7, 8 and 9, which are respectively sectional elevation, plan and cross section of the producer. The essential modification consists in altering the flue and air spaces surrounding the decomposing chamber C by which the secondary air supply can be more highly heated and introduced to the carbonic oxide gases coming from the combustion chamber at the top of and external to the decomposing chamber instead of at the bottom and internal as in the previously described arrangement thereby enabling a much larger quantity of carbon to be accumulated in the producer. $C'$ and $C^2$ are the annular spaces or flues for the products of combustion terminating in the smoke stack $C^3$ and the secondary air to be heated enters by the pipe $E^4$ into the heating annular space D descending and again ascending and meeting the carbonic oxide gases as they come through the ports $D^2$ at the top of the decomposing chamber. The admission of the secondary air at the top and external to the decomposing chamber allows the surplus carbon deposited from the liquid hydrocarbon to accumulate not only in the combustion chamber but also partially in the decomposing chamber and to become highly heated not only by the hot producer gases from the combustion chamber but also by the combustion of the carbonic oxide gas by the secondary air around the walls of the decomposing chamber. The process of gasifying the liquid hydrocarbon by this modified construction is in every other respect identical with that previously described. The increased quantity of carbon contained in the producer enables a greater store of heat to accumulate each time the carbon is blown up with air. This increased store of heat in turn is devoted to a larger production of water gas intermittent with the decomposition of the liquid hydrocarbon; or should the carbon accumulate then the process may be so modified that the accumulated heat of the one blowing up of the generator may be as far as possible devoted to gasifying the liquid hydrocarbon, only sufficient water gas being made to wash out the apparatus, the next two or more blowings up of the carbon to incandescence being devoted to the production of water gas alone. When such a modified process is adopted the steam for the production of the water gas may be introduced by the pipe S shown in dotted lines into the flue space $C^2$ descending which it ascends the flue space $C'$ and getting highly heated passes down through the highly heated carbon getting decomposed into water gas which would pass into the ashpit $B^2$ and away by the pipe $S^2$, shown by dotted lines, to any suitable cooling arrangement.

Instead of producing the water gas and decomposing the liquid hydrocarbon alternately the two processes may be conducted simultaneously, but in such a case it is necessary to employ two or more combustion and decomposing chambers in one producing arrangement. Such an arrangement of apparatus is shown in Figs. 10, 11 and 12, which are respectively a sectional elevation, a plan and a cross section of a producer consisting of three separate combustion chambers B, B, B, and decomposing vessels C, C, C. Each combustion and gas generating chamber B is provided with clinker doors $B^3$ and ashpit $B^2$, primary air valves $E^2, E^2, E^2$, as also separate valves $F^2, F^2, F^2$, for the admission of steam. The three separate decomposing chambers C, C, C, are surrounded by the flue space $C'$ in which the carbonic oxide gases coming from all the combustion chambers B, B, B, through the ports $D^2$ are consumed to form carbonic acid gas by the secondary current of air admitted by the valve $E^3$ and pipe $E^4$ into and superheated in the flues D, D, the products of combustion passing away by the stack $C^3$. In producing illuminating gas by this modification, each of the three combined combustion gas generating and decomposing chambers is brought into working order and operated in the same manner as with the construction already described. Instead however of the whole three being used at the one time in the same sequence of operating, one of the three sections of the producer may be producing water gas alone, while the other two are employed to decompose the hydrocarbon fluid, or two sections may be employed producing water gas while the other is alone devoted to the decomposition of the liquid hydrocarbon and each section may be used in sequence, that is the sections may be used alternately for the production of water gas and decomposing the liquid hydrocarbon, using the stored up heat of the one blowing up with air to produce water gas, and the next blown-up to decompose the liquid hydrocarbon, each of the sections being provided with the steam valves $F^2, F^2, F^2$, and the valves $O', O', O'$, and pipes O, O, O, for the admission separately of a supply of steam and of liquid hydrocarbon into each section of the producer as desired. The commingled gases from the three sections pass away by the pipe $G^2$ to the condenser H.

Some hydrocarbon fluids during the process of volatizing, sponge or swell up in foam and such hydrocarbon fluid when dropped on the top of the heated carbon contained in the combustion and gas generating chamber sponges up and closes the spaces between the carbon and impedes the process of gasification.

To overcome that difficulty a modified arrangement is adopted as shown in Figs. 13 and 14 which are respectively vertical sections at right angles to each other and Figs. 15 and 16 which are a plan and cross section of the producer. The essential features of difference in the modification are the placing of the decomposing chambers in a sloping instead of a horizontal position to prevent the hydrocarbon fluid dropping on to the top of the carbon in the combustion and gas producing chamber. The decomposing chambers consist of a series of retorts or chambers C made of fire brick or other refractory or fire resisting material. These are placed at a slight inclination alternately in the reverse direction and are connected by the chambers $C^5$ provided with the access doors $C^6$. The lower inclined decomposing chamber C is in direct communication through the opening $C^7$ with the combustion and gas generating chamber B and the upper inclined decomposing chamber has an opening $D^4$ communicating with the flue space $C'$ around the outside of the decomposing chambers C. The upper inclined chamber is provided with a mouth piece G with door $G'$ connected by the pipe $G^2$ to the seal box $G^3$. The decomposing chambers C are provided with iron sole plates to prevent the liquid hydrocarbon from penetrating the fire clay soles of the chambers and the chambers are strongly bound by fire brick blocks placed in the flue space to prevent disintegration of the clay retorts. This modified construction is operated substantially in the manner already described, the primary air being supplied through the valve $E^2$ and pipe $E'$ and the secondary air by the valve $E^3$ and pipe $E^4$ to the heating flues D, the carbonic oxide gases from the combustion chamber meeting the secondary air as it enters the flue space $C'$ through the ports $D^4$ in the upper chamber C and the combustion of the carbonic oxide gases taking place in the space or flue around the decomposing chamber walls. The only essential difference is that instead of the liquid hydrocarbon dropping vertically through the decomposing chamber upon the hot carbon it is allowed to flow from the supply tank down the pipe G² into the upper inclined decomposing chamber down the bottom of which it flows to the second chamber and so on to the bottom chamber, being in its passage volatilized and in part gasified.

The large surface area of the bottom of the decomposing chamber allows the liquid hydrocarbon to spread and volatilize without foaming or seriously impeding the action of the apparatus. By this arrangement the carbon is principally deposited upon the bottom of the decomposing chambers and has from time to time to be raked down into the combustion and gas generating chamber by means of suitable tools inserted through the openings C⁵ provided with doors C⁶. The products of decomposition coming from the generator are treated in the condenser as already described.

The only remaining parts of this invention requiring explanation are matters relating to the nature of the liquid hydrocarbons and the modified method of using them or of treating them prior to their introduction to the gas generator.

When the hydrocarbon liquids employed are free from water and require a low heat for their decomposition such as is the case with natural petroleum and paraffin oils then the best results will be obtained by dividing the decomposing process into two stages.

The portion of the oils which is purposely allowed to escape decomposition in the decomposing chamber in order to keep the flocculent carbon in solution and enable it to be returned from the condensers to the producer requires a higher temperature for its decomposition than would give the best results with the original oil.

To enable the portions to be subjected to the desired temperature the generator is provided with two supply cisterns N and N' as shown by Figs. 2 and 8. The fresh oil is charged into the cistern N' while the condensed returned products are pumped into the cistern N.

When the producer has been nearly blown up with air and the carbon and the walls of the decomposing chamber are at a high temperature and the decomposition of the hydrocarbon commenced the returned condensed products contained in cistern N are at first run into the producer as they require the highest temperature for their decomposition. As the temperature of the heat of the carbon and the walls of the decomposing chamber falls and becomes suited for the decomposition of the fresh oil, the returned products are shut off and the fresh oil in the cistern N' made to take the place of the returned products.

When the liquid hydrocarbons are crude and tarry and contain water, or when as in the case of coal tar they contain benzole, which it is desired to recover in the liquid form, then such liquid hydrocarbons require to be passed back through the condensing arrangement so as to enable the water and benzole to be isolated and removed and fit them for the process of decomposition.

The gases and vapors coming from the producer have so high a temperature that in bubbling through the hydrocarbon liquids in the seal box G³ they heat those liquids up to a temperature considerably over the boiling point of water. Even after traveling forward through the first set of condensing pipes and entering the first washing chest the vapors and gases will still be little if at all under the boiling point and are still capable of holding in diffusion the volatile benzole and water vapor. From this point the temperature of the vapor and gases gradually falls till a little over that of the atmosphere before leaving by the pipe H⁵. Now by causing the tarry liquid hydrocarbons to travel back against the current of gas and vapor, and by bringing them into intimate contact with the gases and vapors coming from the producer, first in the washing chests of the condenser, and finally in the seal box, the tarry liquid hydrocarbons are gradually heated to such a temperature, that the water and volatile hydrocarbons are liberated from the tar and driven forward into the condenser chests where they are condensed. In order to isolate or separate the water and hydrocarbons so liberated, as also water which may be derived from steam coming from the producer one of the condenser chests is isolated, the flow of tar or hydrocarbon liquids being by-passed by means of the stop cocks K² on the pipes K', that chest being selected where the gases and vapors have been so far cooled as to allow of the water and hydrocarbons being condensed and collected, the condensed liquid produced being drawn off through the stop cock K³ on the chest through the pipe K⁴ into the tank K⁵ provided for the purpose.

The apparatus in the several forms described is applicable for use in the production of water gas alone, the arrangements for supplying the liquid hydrocarbons being omitted and a supply of solid carbon to replace that deposited from such hydrocarbons being fed into or through the decomposing chamber.

Having thus particularly described my said invention and arrangement of apparatus whereby the same may be carried into effect, I wish to state that I make no general claim for a gas producer in which water gas and carbureted water gas is produced by the alternate blowing up with air to incandescence of a mass of carbon contained in a combustion chamber and the heating up of a decomposing chamber or retort in connection with the same, and thereafter shutting off the air and blowing in steam and running into the decomposing chamber hydrocarbon fluid. Neither do I claim a condensing and washing apparatus in connection with such a gas generator, because these are well known forms of apparatus and methods of producing illuminating and heating gases; but What I consider to be novel and original, and therefore claim, is—

The process of decomposing or gasifying liquid hydrocarbons to produce illuminating gas, which consists in blowing steam through a mass of carbon raised to incandescence by an air blast in the lower end of a gas producer or decomposing chamber to produce water gas for sweeping out the chamber, then cutting off the steam and passing liquid hydrocarbon in at the top of the decomposing chamber and on to the incandescent carbon, whereby the hydrocarbon is decomposed and illuminating gas is produced, the said gas flowing out against the stream of inflowing hydrocarbon and being scrubbed by it, so that the condensible vapors and flocculent carbon produced are absorbed and again discharged into the decomposing chamber, and the carbon present in the liquid hydrocarbon in excess of what can be gasified by destructive distillation is isolated and deposited in the gas producer so as to render it directly available as the source of heat by its partial combustion with air to effect the destructive distillation of the liquid hydrocarbons and to produce water gas sufficient to wash out the apparatus, substantially as described.

In witness whereof I have hereunto set my hand and seal the 15th day of March, 1894.

WM. YOUNG. [L. S.]

Witnesses:
    WALLACE FAIRWEATHER,
*C. E., Chartered Patent Agent, 62 St. Vincent Street, Glasgow.*
    JOHN ARMSTRONG, Jr.,
*Clerk, 62 St. Vincent Street, Glasgow.*